(12) United States Patent
Baris

(10) Patent No.: US 12,193,449 B2
(45) Date of Patent: Jan. 14, 2025

(54) SEPARATING DEVICE, RELATED CRIMPING ELEMENT, AND METHOD

(71) Applicant: VEMAG Maschinenbau GmbH, Verden (DE)

(72) Inventor: Halis Baris, Dörverden (DE)

(73) Assignee: VEMAG Maschinenbau GmbH, Verden (DE)

( * ) Notice: Subject to any disclaimer, the term of this patent is extended or adjusted under 35 U.S.C. 154(b) by 24 days.

(21) Appl. No.: 18/349,722

(22) Filed: Jul. 10, 2023

(65) Prior Publication Data

US 2024/0008499 A1 Jan. 11, 2024

(30) Foreign Application Priority Data

Jul. 8, 2022 (DE) .......................... 102022117135.3

(51) Int. Cl.
*A22C 11/00* (2006.01)
*A22C 11/10* (2006.01)

(52) U.S. Cl.
CPC ............ *A22C 11/10* (2013.01); *A22C 11/006* (2013.01)

(58) Field of Classification Search
CPC ............................... A22C 11/10; A22C 11/006
USPC ..................................................... 452/30–32
See application file for complete search history.

(56) References Cited

U.S. PATENT DOCUMENTS

| 5,788,563 A * | 8/1998 | Nakamura ........... A22C 11/107 452/47 |
| 9,314,036 B2 * | 4/2016 | Wiemer ................ A22C 11/125 |
| 2019/0059403 A1 * | 2/2019 | Mach ..................... A22C 11/02 |
| 2022/0361512 A1 | 11/2022 | Knodel et al. |

FOREIGN PATENT DOCUMENTS

| DE | 102006016825 A1 | 10/2007 |
| DE | 102021112517 B3 | 4/2022 |
| DE | 102021112513 B3 | 6/2022 |
| EP | 0440039 A1 | 8/1991 |
| EP | 2117325 B1 | 11/2010 |
| EP | 3909430 A1 | 11/2021 |
| WO | 2017081648 A1 | 5/2017 |

OTHER PUBLICATIONS

European Patent Office, Extended Search Report issued in EP Patent Application No. 23182776.7-1105, dated Nov. 24, 2023, 7 pages.

* cited by examiner

*Primary Examiner* — Richard T Price, Jr.
(74) *Attorney, Agent, or Firm* — Wood Herron & Evans LLP

(57) ABSTRACT

A separating device is provided for separating portions of elongate casings filled with food mixture, in particular sausage portions of alginate casings filled with sausage meat. The separating device includes two circulating transport elements; at least one crimping element, each having a fastening section, a crimping section, and a counter holder. According to the invention, the counter holder is flexible such that it applies a preloading force to the crimping element arranged on the opposite transport element to improve the separating effect of the crimping elements.

15 Claims, 9 Drawing Sheets

SEPARATING DEVICE, RELATED CRIMPING ELEMENT, AND METHOD

CROSS-REFERENCE TO RELATED APPLICATION

This application claims priority to German Application No. DE 10 2022 117 135.3, filed Jul. 8, 2022. The above-mentioned patent application is incorporated herein by reference in its entirety.

TECHNICAL FIELD

This application relates to a separating device for separating portions of elongate casings filled with food mixture, in particular sausage portions of alginate casings filled with sausage meat. This application also relates to a crimping element and an associated method.

BACKGROUND

In known devices and methods for producing sausages, artificial or natural skins are filled with a paste-like mixture such as forcemeat and portioned with the aid of a pump or a filling machine and a portioning device and then divided into individual sausages; a casing is also filled with other mixtures in the same way. The mixture is usually provided by a filling machine with a filling funnel and a feed pump. In this type of known method, a twist which delimits individual portions of sausages from one another is produced in the skin casing by a twisting apparatus and the portioning device.

In another type of portioning device of the type in question, sausage portions are not twisted but the casing is coextruded in liquid form around a string of the food mixture. The casing, which is often produced from alginate, solidifies. After such a filled casing is produced, so-called crimping elements press into the casing filled with food mixture during further transport and displace both the food mixture and the casing so that a constriction results. Crimping elements known previously from the prior art also have cutting edges, which allow the sausage portions to be divided after the constriction is formed.

The crimping elements are typically arranged at intervals of approximately the length of a sausage on conveying elements. The crimping elements previously known from the prior art have a fastening section for fastening the crimping element to a transport element and a crimping section which extends from the fastening section and typically has two arms which open from a main section. Cutting edges for separating the portions are in turn formed in the region of the arms.

Also known from the prior art is the use of so-called counter holders, which are designed to press a crimping section of a crimping element arranged on an opposite transport element against the crimping section of the crimping element with a contact force when the crimping elements are moved towards one another. Although reliable separation of the sausage portions is ensured by the above-described design of the crimping elements, there is still room for improvement.

For instance, it has often been observed in practice that sausage ends of sausages in alginate or collagen casings which are produced only by constriction using crimping elements previously known from the prior art are not completely closed at the separation points between two sausages. This usually means that the sausage end produced does not resemble the traditionally twisted sausage end in terms of its visual properties, as desired. Such incompletely closed separation points are sometimes considered undesirable by the consumer.

The invention is therefore intended to advantageously develop a separating device, a crimping element and an associated method such that the disadvantages found in the prior art are overcome as far as possible.

SUMMARY

These and other technical objects and problems are addressed by the embodiments provided in this invention. In particular, a separating device shall be specified which allows improved closing of the separation points between two sausage portions and ensures that the alginate casing is pulled as completely as possible around the portion. The separating device for separating portions of elongate casings filled with food mixture, in particular sausage portions of alginate casings filled with sausage meat, has two circulating transport elements which are spaced from one another, can be driven by at least one drive and each have a transport region, which is moved in a transport direction during operation, and a return region. The filled casings can be introduced between the transport regions of the two transport elements and can be transported in the transport direction, and the transport elements are oriented such that the distance between the transport elements in the transport region is reduced in the direction of the transport direction. The separating device also includes at least one crimping element which is arranged on each transport element and protrudes laterally from the transport element, where two crimping elements of the spaced-apart transport elements are moved towards one another when moved in the transport direction. One of the crimping elements, in particular both crimping elements, have: a fastening section for fastening the crimping element to the transport element, a crimping section which extends from the fastening section and has two arms which open from the main section, and a counter holder which is designed to press a crimping section of the crimping element arranged on the opposite transport element against the crimping section of the crimping element with a contact force when the crimping elements are moved towards one another.

According to the invention, the object of a device of the type mentioned in the introduction is achieved in that the counter holder is flexible such that it applies a preloading force to the crimping element arranged on the opposite transport element to improve the separating effect of the crimping elements.

The invention makes use of the finding that the flexible counter holder makes it possible for the crimping elements to slide into one another ideally. The flexible counter holder ensures that the separating force which is exerted by two cooperating crimping elements on a point to be separated of a sausage string is greater the further the crimping elements are pressed into one another. This makes it possible to omit the formation of cutting edges on the crimping elements, which is in turn advantageous with regard to gentle formation of the sausage ends without damaging the casing, in particular alginate casing, by cutting. In other words, it is made possible for an in particular completely closed sausage end to be produced first by the crimping elements. Only then are the sausage portions divided. The formation of cutting edges on the crimping elements is not necessary because a sufficient separating force of the crimping elements is achieved even without the provision of cutting edges thanks to the preloading force applied by the counter holder.

The invention is refined in that the counter holder has a ridge which extends from the fastening section and a contact section which is arranged adjacently to the ridge, wherein the contact section is designed to come into contact with an opposite crimping element and to apply the contact force to the opposite crimping element.

Preferably, the preloading force to be applied is influenced by the shape of the ridge. In particular, the flexibility of the counter holder can be influenced via a targeted selection of the thickness of the ridge on the counter holder, wherein in particular a thicker ridge entails a lower flexibility of the counter holder and greater separating forces can be achieved thereby. On the other hand, the formation of a thinner ridge can achieve greater flexibility and reduce the separating force of the crimping elements as a result. In this way, the separating force which can be applied by the crimping elements can be influenced for example depending on the sausage calibre to be processed or else the filling material.

According to a preferred embodiment, the ridge has a thickness of 0.5 mm to 5 mm. If the crimping element is formed from engineering plastic, in particular polyoxymethylene (POM), the ridge thickness is preferably 1 mm to 5 mm, in particular 1.5 mm to 2.5 mm. If the crimping element is formed from metal, the ridge thickness is preferably 0.5 mm to 2 mm. The described thickness range has proven particularly suitable for achieving a sufficient separating force of the crimping elements.

The invention is refined in that the counter holder extends from the fastening section. The counter holder thus runs at least in some sections parallel to the crimping section and in the same direction as the crimping section from the fastening section. Preferably, the counter holder has, in the region of the contact section, a cut-out which is formed over a height region of the crimping element. This likewise enables the flexibility of the counter holder to be influenced as desired. Alternatively, the flexibility of the counter holder can also be provided for example via a targeted selection of the counter holder material.

The invention is refined in that the crimping section has, on its side facing away from the counter holder, a slope which is designed to cooperate with the contact section of an opposite crimping element such that opposite crimping elements are pressed against one another when moved towards one another. The slope, in cooperation with the counter holder, has the effect that the separating force is greater the further the crimping elements are pressed into one another.

According to a preferred embodiment, the counter holder, in particular together with the crimping section, forms a pocket which is designed to receive a crimping section of an opposite crimping element at least in some sections. In this way, an opposite crimping element is guided safely.

The invention is refined in that the arms have a crowned separating face on their side facing an adjacently arranged second crimping element during operation. In combination with the flexible counter holder, a defined separating force can be generated thereby, in particular in the center of the crimping element.

According to a second set of embodiments of the invention and an advantageous refinement of the invention according to the first set of embodiments described above, it is proposed according to the invention for the arms to be curved on the side facing away from the counter holder and to have rounded edges so that the filled casing is constricted in a constriction region, displacing the mixture, and the casing is pulled around the portion, in particular completely, before the portions are separated.

The second set of embodiments of the invention are based on the finding that the curved formation of the arms with rounded edges allows particularly gentle shaping of the sausage ends to be achieved without damaging the casing, in particular the alginate casing. As a result, the alginate casing is pulled in particular completely around the sausage portion without the portions being severed. The actual separating process, which separates the sausage portions from one another, does not take place until after complete formation of the sausage ends, wherein the counter holder is used to increase the separating force for this purpose.

According to a preferred embodiment, the arms extend in an arcuate shape from the main section. This likewise achieves an advantageous formation of the sausage ends without already damaging or even severing the alginate casing during shaping of the sausage ends. According to one embodiment, the curve is a convex curve.

The invention is refined in that the main section forms a center which is arranged asymmetrically in relation to a total height of the crimping element, in particular wherein the center is arranged in an operating position in a lower height half, in particular in a lower height third, in relation to the total height H. In other words, the center of the crimping elements, seen in an operating position, is pulled as far down as possible so that the falling height of the sausage portions onto a discharge belt arranged below the crimping elements is as small as possible.

According to one embodiment, the crimping elements are oriented relative to the transport elements such that the crimping elements run parallel to one another in the transport region. According to a preferred embodiment, the crimping element is formed from or consists of one of the following materials: metal, engineering plastic, in particular polyoxymethylene. The above material selection has proven particularly suitable for the intended purpose. It has been found that crimping elements formed from the above materials have a high level of durability, and a sufficient preloading force is also provided even after a large number of cycles.

According to a preferred embodiment, the transport elements have receiving means for receiving the fastening sections of the crimping elements. In this way, the crimping elements can be arranged detachably on the transport element and can be easily removed or exchanged for maintenance purposes.

The invention has been described above with reference to a separating device. In a further embodiment, the invention relates to a crimping element for a separating device for separating portions of elongate casings filled with food mixture, in particular sausage portions of alginate casings filled with sausage meat, wherein the crimping element has: a fastening section for fastening the crimping element to the transport element, a crimping section which extends from the fastening section and has two arms which open from a main section, a counter holder which is designed to press a crimping section of the crimping element arranged on the opposite transport element against the crimping section of the crimping element with a contact force when the crimping elements are moved towards one another.

The invention achieves the object identified in the introduction with regard to the crimping element in that the counter holder is flexible such that it applies a preloading force to the crimping element arranged on the opposite transport element to improve the separating effect of the crimping elements.

The crimping element is preferably designed according to at least one of the characterising features of the above exemplary embodiments. The crimping element thus makes use of the same advantages and preferred embodiments as the separating device according to the invention, and vice versa. In this respect, reference is made to the above statements, and the content thereof is included herein.

According to a further embodiment of the invention and an advantageous refinement of the crimping element, it is proposed according to the invention for the arms to be curved on the side facing away from the counter holder and to have rounded edges so that the filled casing is constricted in a constriction region, displacing the mixture, and the casing is pulled around the portion, in particular completely, before the portions are separated.

The crimping element according to the further embodiment of the invention also makes use of the same advantages and preferred embodiments as the inventive crimping element according to the first set of embodiments, and vice versa. In this respect, reference is made to the above statements, and the content thereof is included herein.

In a further embodiment, the invention relates to a method for forming and separating portions of elongate casings filled with food mixture, in particular sausage portions of alginate casings filled with sausage meat, in which food mixture is inserted into the casing to be filled by a filling machine, the filled casing is transported by a separating device, in particular a separating device according to one of the above exemplary embodiments, in a transport direction, wherein the filled casing is brought between two drivable, circulating transport elements and is constricted in a constriction region and separated by two adjacently arranged crimping elements which are each arranged on a transport element, wherein the crimping elements have a counter holder which is designed to press a crimping section of the crimping element arranged on the opposite transport element against the crimping section of the crimping element with a contact force when the crimping elements are moved towards one another, wherein the counter holder is flexible such that it applies a preloading force to the crimping element arranged on the opposite transport element to improve the separating effect of the crimping elements.

The method makes use of the same advantages and preferred embodiments as the separating device according to the invention and the crimping element according to the invention, and vice versa. In this respect, reference is made to the above statements, and the content thereof is included herein.

Additionally or alternatively to the flexible design of the counter holder, it is also proposed for the method for the arms to be curved on the side facing away from the counter holder and to have rounded edges so that the filled casing is constricted in a constriction region, displacing the mixture, and the casing is pulled around the portion, in particular completely, before the portions are separated.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
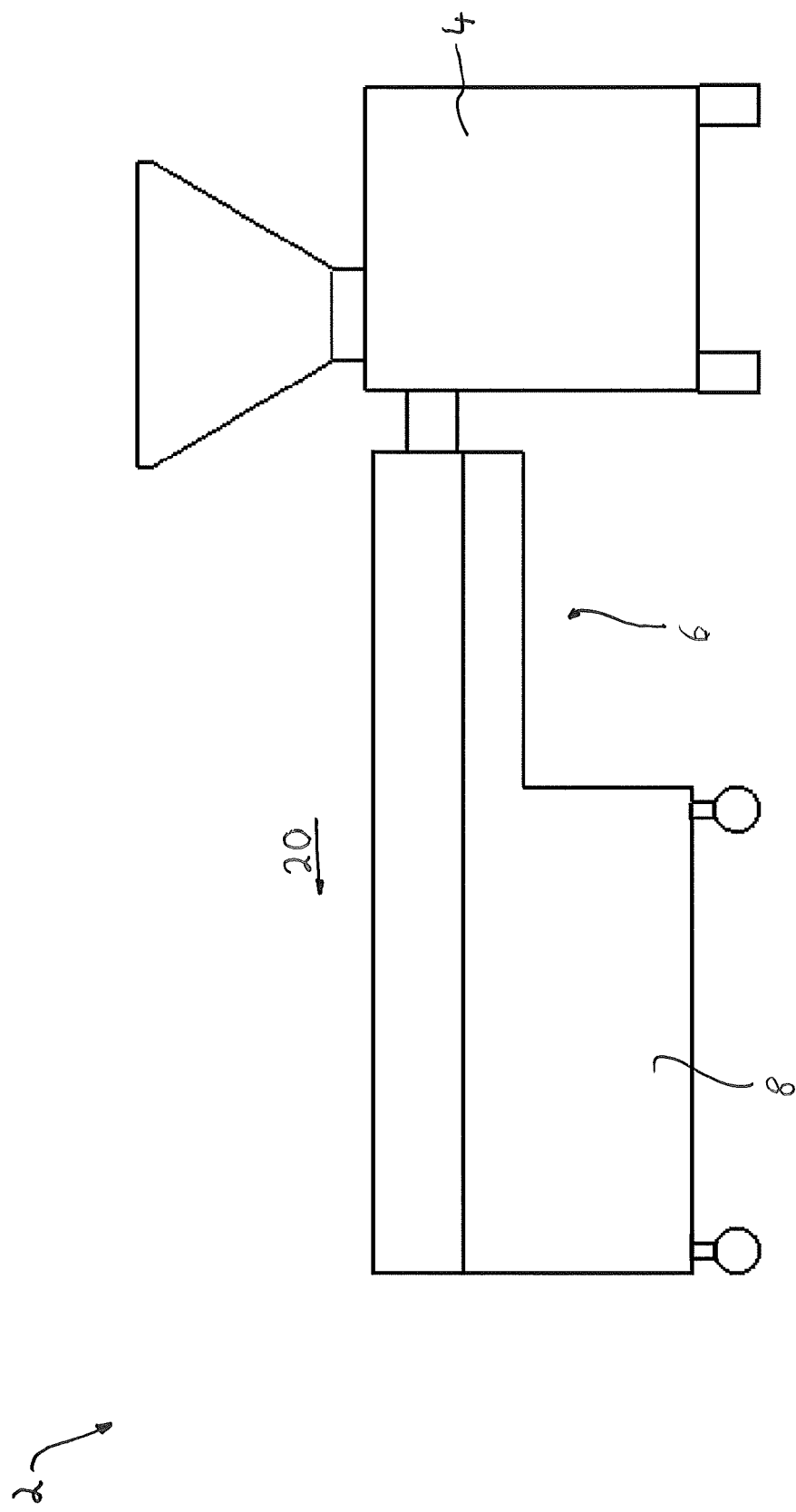
FIG. 1 is a side view of an arrangement for producing portions of a casing filled with food mixture, including a filling machine and a portioning device, as well as a separating device according to embodiments of the invention.

FIG. 1 shows an arrangement 2 for producing sausage portions 10 (not shown; see FIG. 2) of a casing 12 filled with food mixture 11, also referred to as sausage meat 11, said arrangement having a filling machine 4, a portioning device 6, and a separating device 8.

Inside the portioning device 6, which is not shown in detail in the figures, so-called coextrusion takes place, during which the casing 12, for example an alginate casing 12, is applied in liquid form around a string of the food mixture 11. The casings 12, also referred to as sausage string, then pass in a transport direction 20 into the region of influence of the separating device 8, which is shown in more detail in FIG. 2.

The separating device 8 is then used to separate portions 10 of the elongate casings 12 filled with food mixture 11, in particular sausage portions 10 of alginate casings 12 filled with sausage meat 11. The separating device 8 has two circulating transport elements 16a, 16b which are spaced from one another, can be driven by a drive 14, and each have a transport region 18 which is moved in the transport direction 20 during operation and a return region 22.

Figure 2:
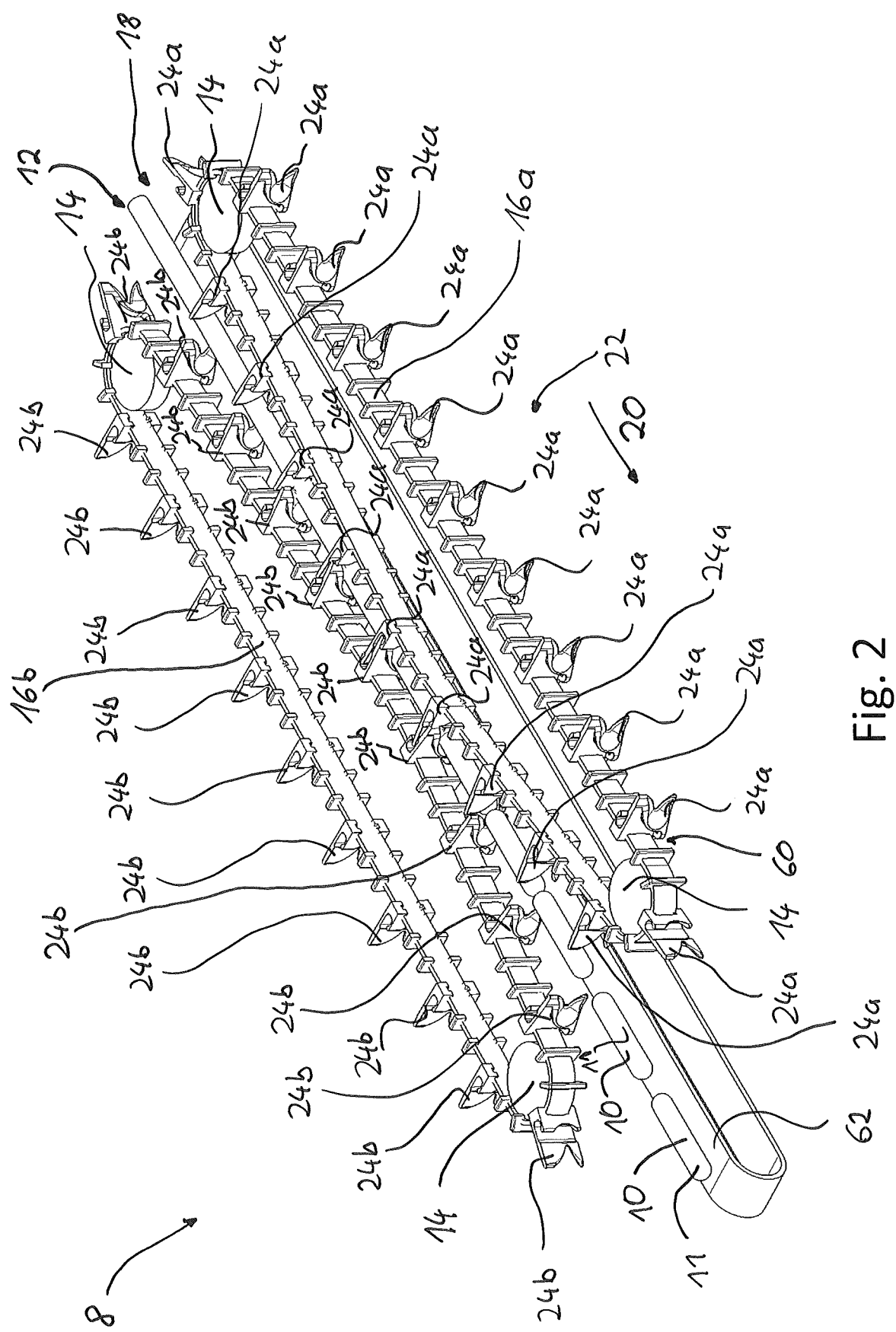
FIG. 2 is a perspective view of a separating device according to embodiments of the invention.

The filled casing 12 is introduced between the transport regions 18 of the two transport elements 16a, 16b and transported in the transport direction 20. The transport elements 16a, 16b are oriented such that the distance between the transport elements 16a, 16b is reduced in sections in the transport region 18 in the direction of the transport direction 20. A plurality of crimping elements 24a, 24b are arranged on each of the transport elements 16a, 16b and protrude laterally from the respective transport element 16a, 16b. Two crimping elements 24a, 24b of the spaced-apart transport elements 16a, 16b are moved towards one another and guided towards one another and then moved away again from one another on moving in the transport direction 20. As shown in FIG. 2, the crimping elements 24a, 24b have the smallest distance from one another approximately in a central region between the drives 14 in the transport region 18 and are then separated again from one another as seen in the transport direction 20.

In other words, a casing 12 filled with food mixture 11 is thus fed to the separating device 9, wherein crimping elements 24a, 24b arranged opposite are moved in the direction of the casing 12 and towards one another, engage in a region of the casing 12, form sausage ends without damaging the alginate casing 12 beforehand, and only when the alginate casing 12 has been pulled completely around the sausage portion 10, sever the casing 12 to form sausage portions 10. The sausage portions 10 then pass onto a discharge belt 62 and are transported away.

Figure 3:
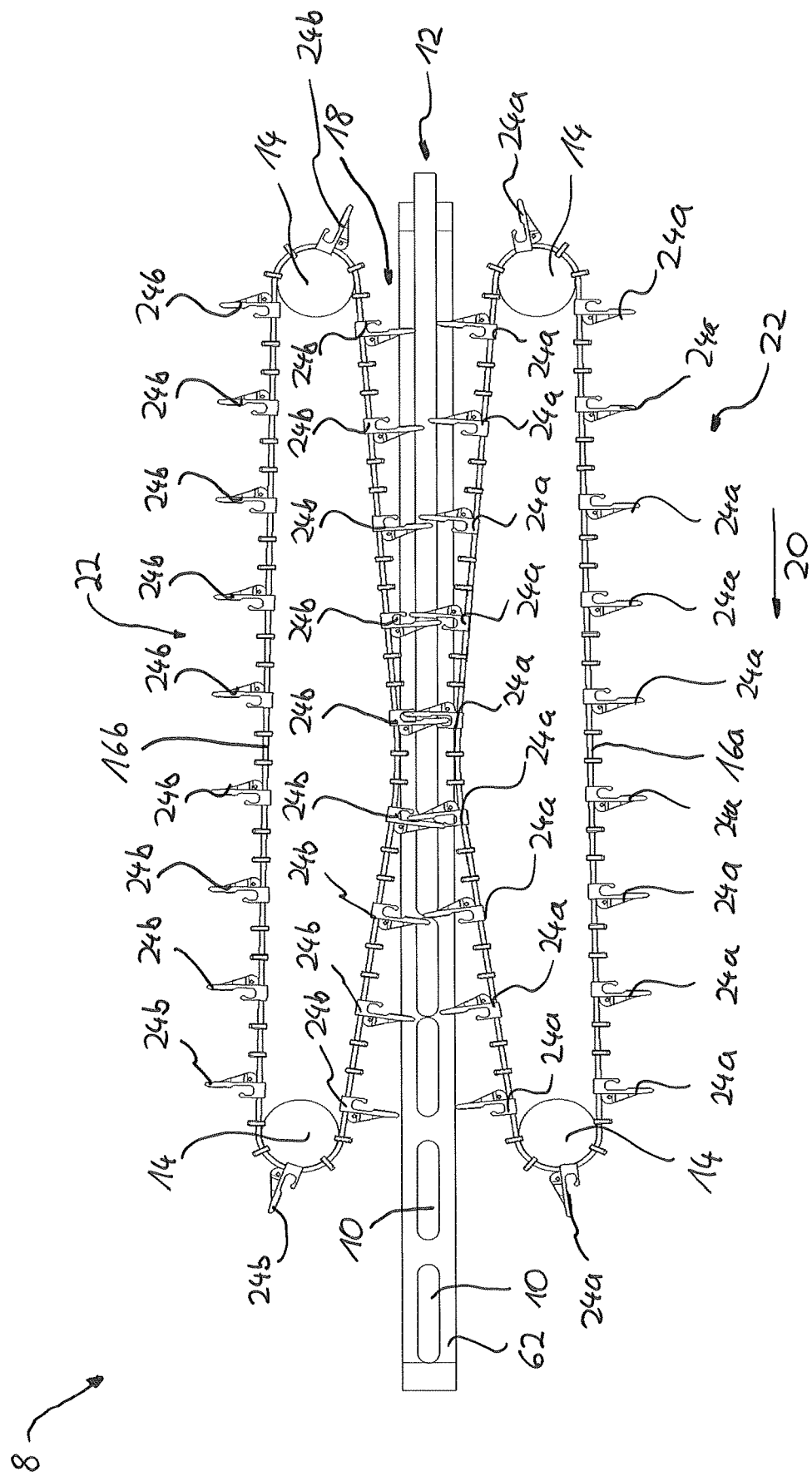
FIG. 3 is a top view of the separating device of FIG. 2.
Figure 4:
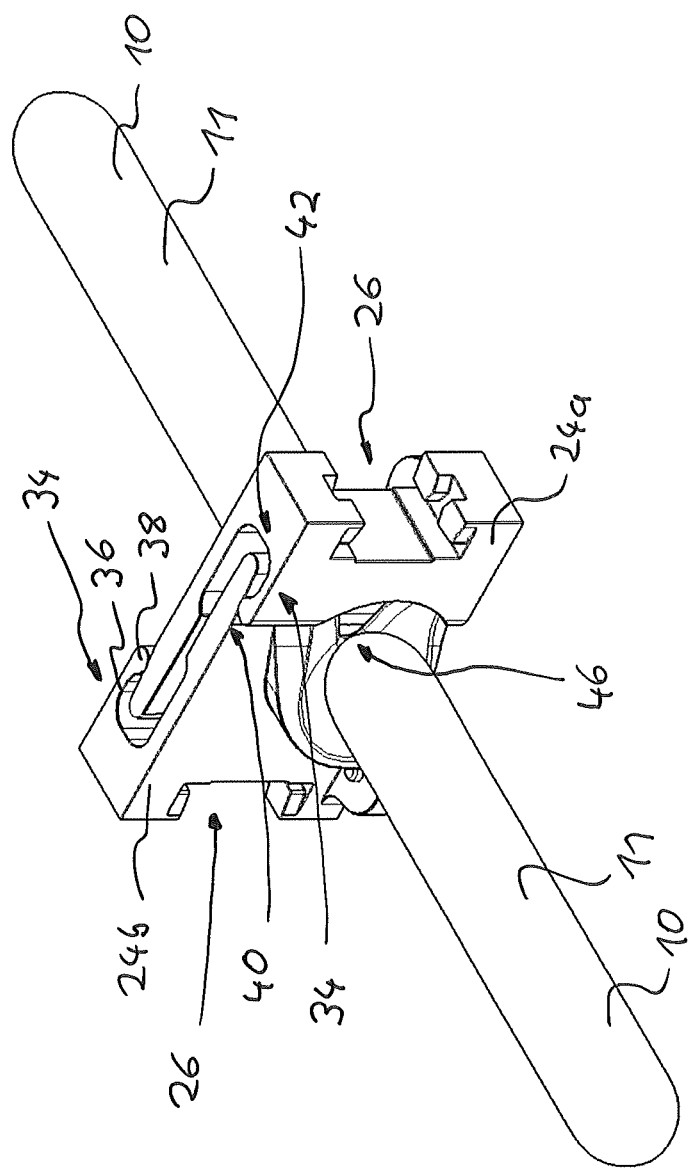
FIG. 4 is a perspective view showing the interaction of crimping elements according to embodiments of the invention during the separation of sausage portions.

The shape of the crimping elements 24a, 24b is shown in detail in the following FIGS. 4 to 7. The crimping elements 24a, 24b have a fastening section 26. The fastening section 26 is designed to fasten the crimping elements 24a, 24b to the respective transport element 16a, 16b, as shown in FIGS. 2 and 3. The transport elements 16a, 16b have transport element receiving elements 60 corresponding thereto.

The crimping elements 24a, 24b also have a crimping section 28 which extends from the fastening section 26 and has two arms 30 which open from a main section 32. The crimping elements 24a, 24b also have a counter holder 34 which is designed to press a crimping section 28 of the crimping element 24b arranged on the opposite transport element 16b against the crimping section 28 of the crimping element 24a with a contact force $F_K$ when the crimping elements 24a, 24b are moved towards one another, as shown for example in FIG. 4.

Figure 5:
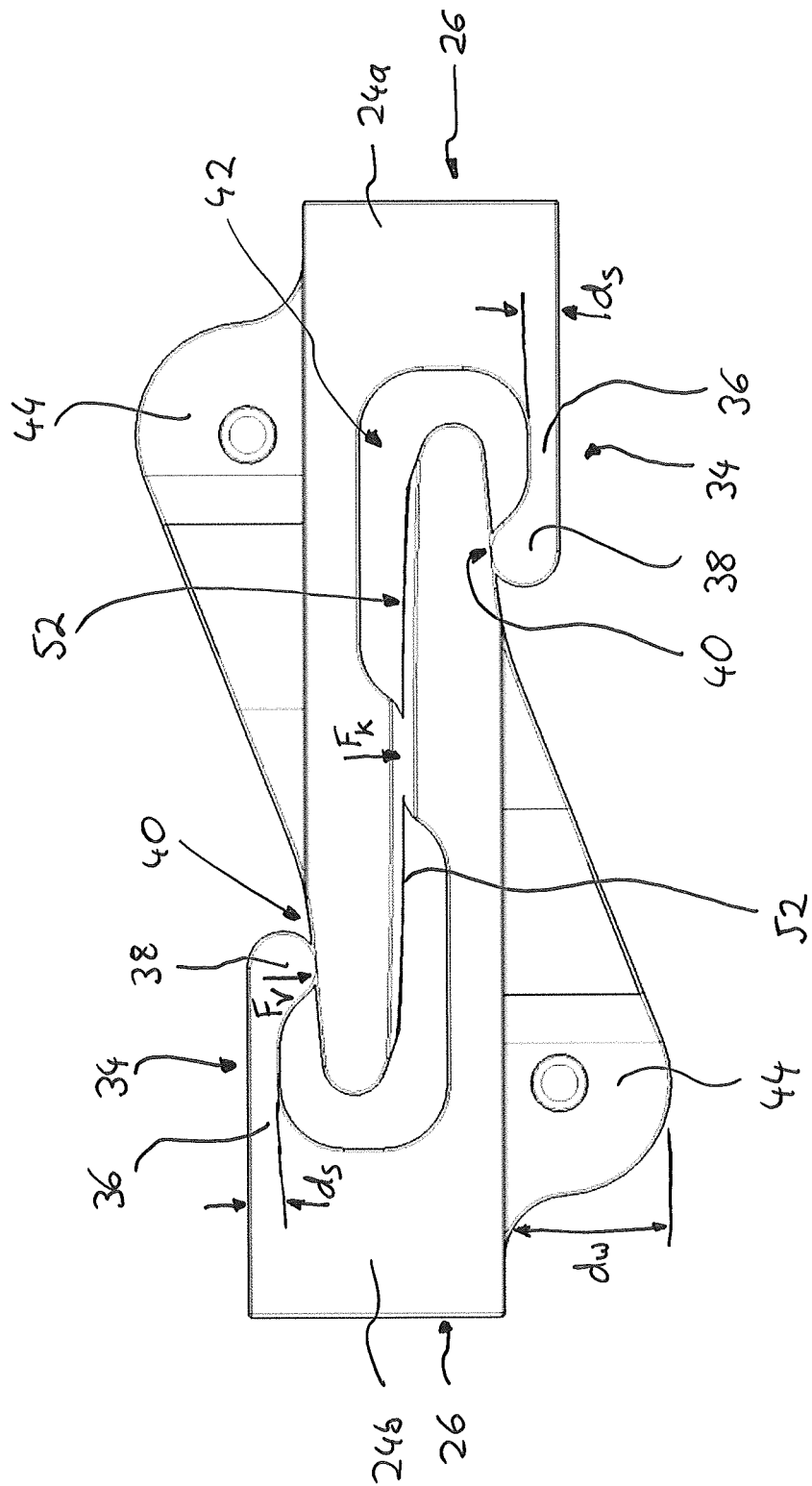
FIG. 5 is a top view of the crimping elements from FIG. 4.
Figure 6:
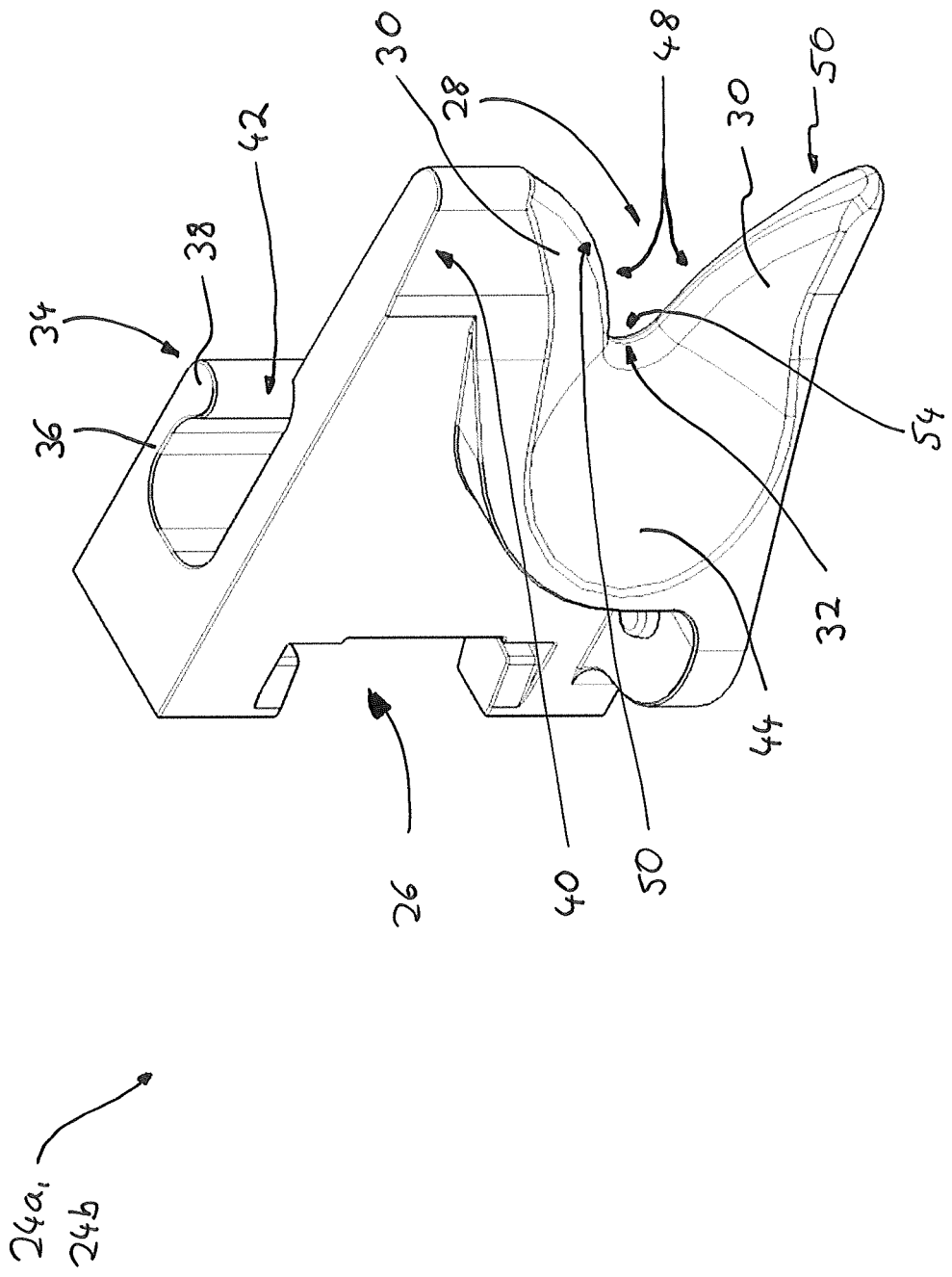
FIG. 6 is a perspective view of a crimping element according to embodiments of the invention.

The counter holder 34 is flexible such that it applies a preloading force to the crimping element 24b arranged on the opposite transport element 16b to improve the separating effect of the crimping elements 24a, 24b. The counter holder 34 has a ridge 36. The ridge 36 extends from the fastening section 25. The counter holder 34 also has a contact section 38 which is arranged adjacently to the ridge 36. The contact section 38 is designed to come into contact with an opposite crimping element 24b and to apply the contact force $F_K$ to the opposite crimping element 24b. The counter holder 34 extends from the fastening section 26. The crimping section 28 also has a slope 40 on its side facing away from the counter holder 34. The slope 40 is designed to cooperate with the contact section 38 of an opposite crimping element such that opposite crimping elements are pressed against one another when moved towards one another so that the crimping elements 24a, 24b can apply a greater separating force to the casing 12. As shown in FIG. 5, the ridge 36 has a thickness $d_s$.

The counter holder 34, together with the crimping section 28, forms a pocket 42. The pocket 42 is designed to receive a crimping section 28 of an opposite crimping element 24b at least in some sections. The arms 30 have, on their side 53 facing an adjacently arranged second crimping element 24b during operation, a crowned separating face 52. By the crowned separating face 52 and the flexible counter holder 34, a defined separating force is generated in a region of the main section 32 of the crimping elements 24a, 24b.

The arms 30 are also curved 44 on the side facing away from the counter holder 34. The curve 44 has a curve thickness $d_W$. The arms 30 have rounded edges 50, so that the filled casing 12 is constricted in a constriction region 46, displacing the mixture 11, and the casing is pulled, in particular completely, around the portions 10 before the portions 10 are separated. The arms 30 extend in an arcuate shape 48 from the main section 32. The main section 32 forms a center 54, which is arranged asymmetrically in relation to a total height H of the crimping element 24a, 24b shown in FIG. 7. In particular, the center 54 is arranged in an operating position in a lower height half 56, in particular in a lower height third 58, in relation to the total height H. The crimping elements 24a, 24b are formed from one of the following materials: metal, engineering plastic, in particular polyoxymethylene.

Figure 8:
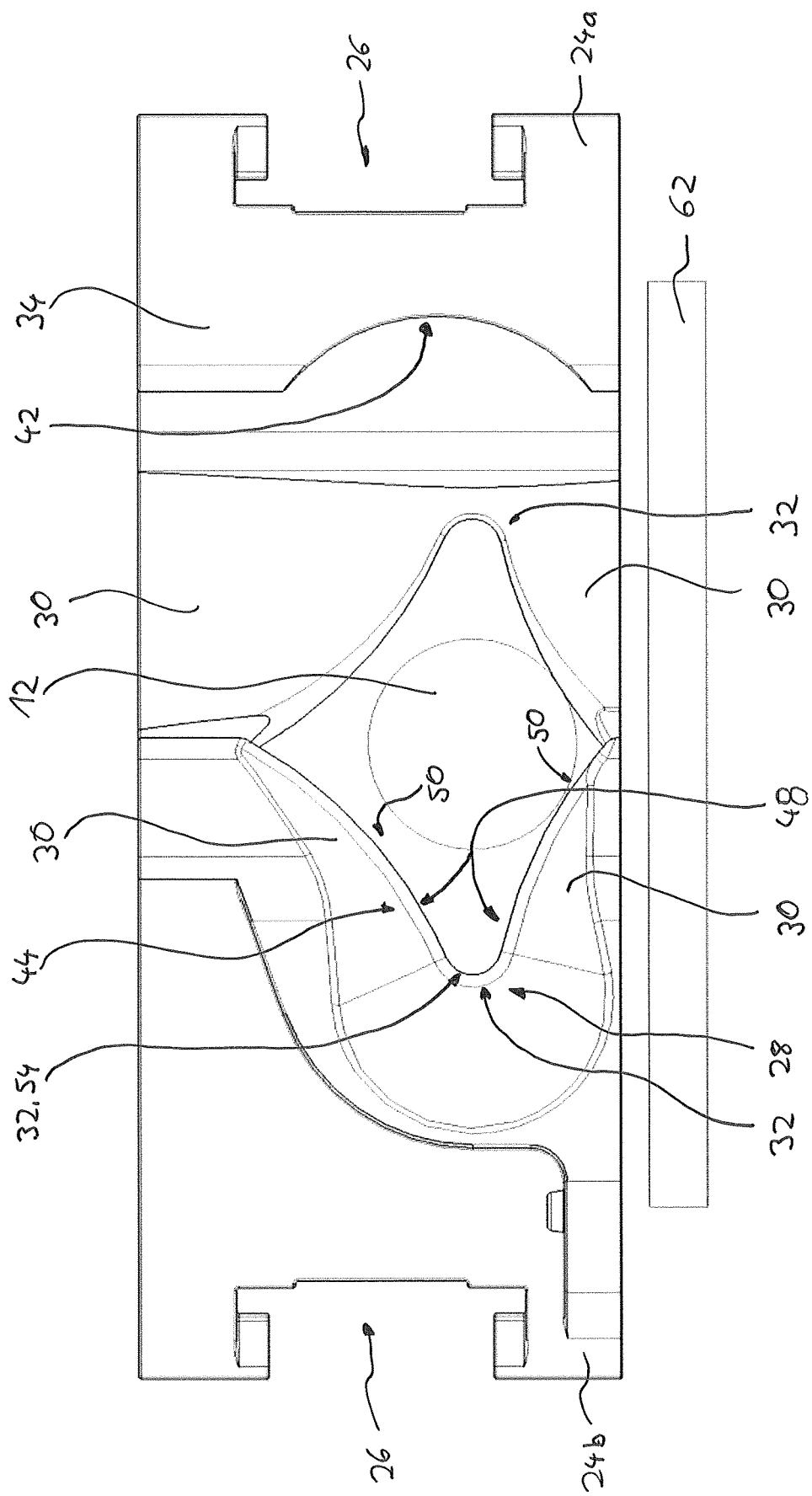
FIG. 8 is a front view showing crimping elements according to embodiments of the invention.
Figure 9:
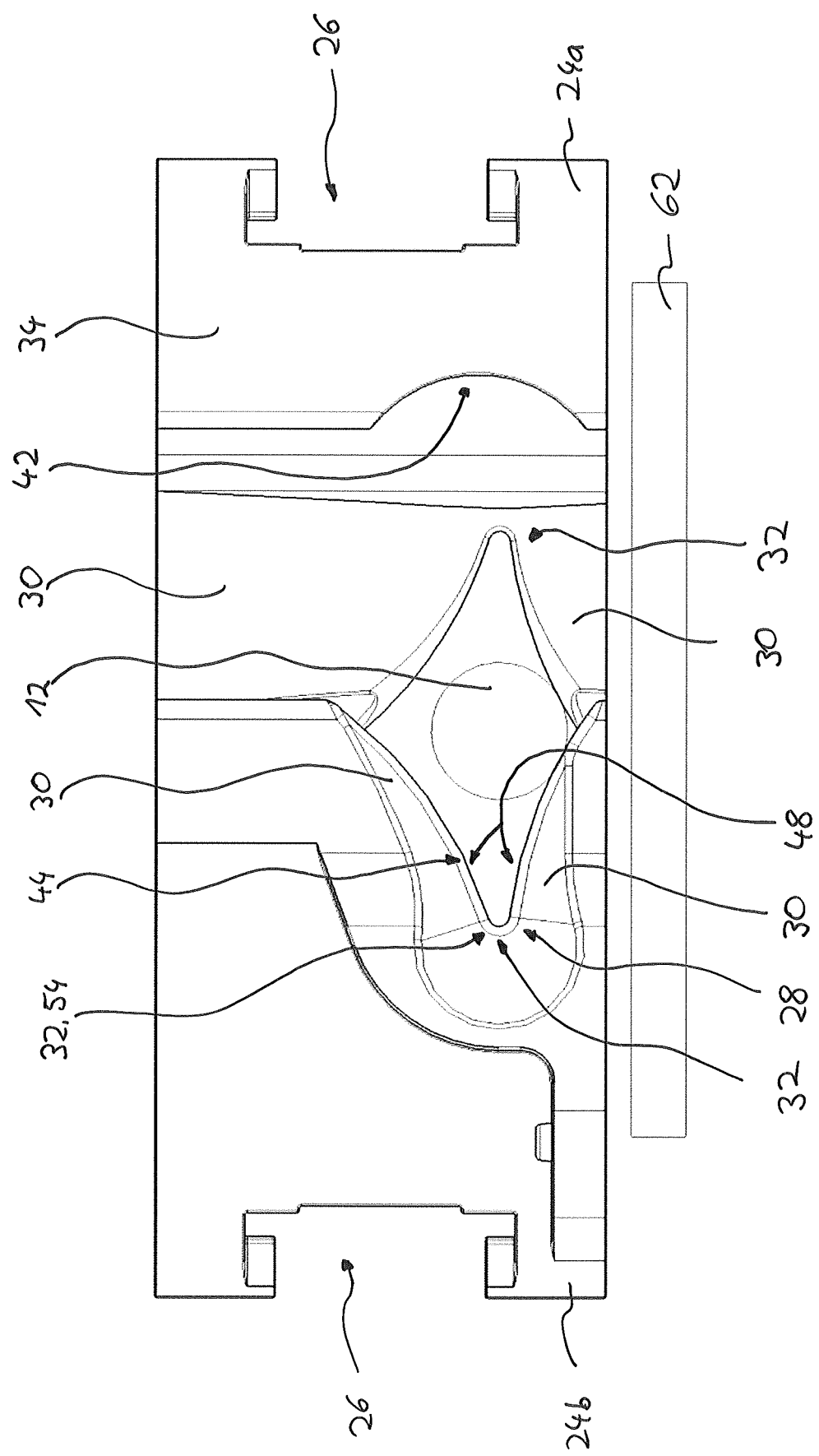
FIG. 9 is a front view similar to FIG. 8 but showing crimping elements according to different embodiments and having different dimensions for processing different sausage calibres.

FIGS. 8 and 9 show different geometries of the crimping elements 24a, 24b, which are adapted to a diameter, also referred to as calibre, of the casing 12 shown in each case. The crimping elements 24a, 24b shown in FIG. 8 are designed to interact with a casing 12 of a larger calibre, while the crimping elements 24a, 24b shown in FIG. 9 are designed to interact with a casing 12 of smaller calibre.

Figure 7:
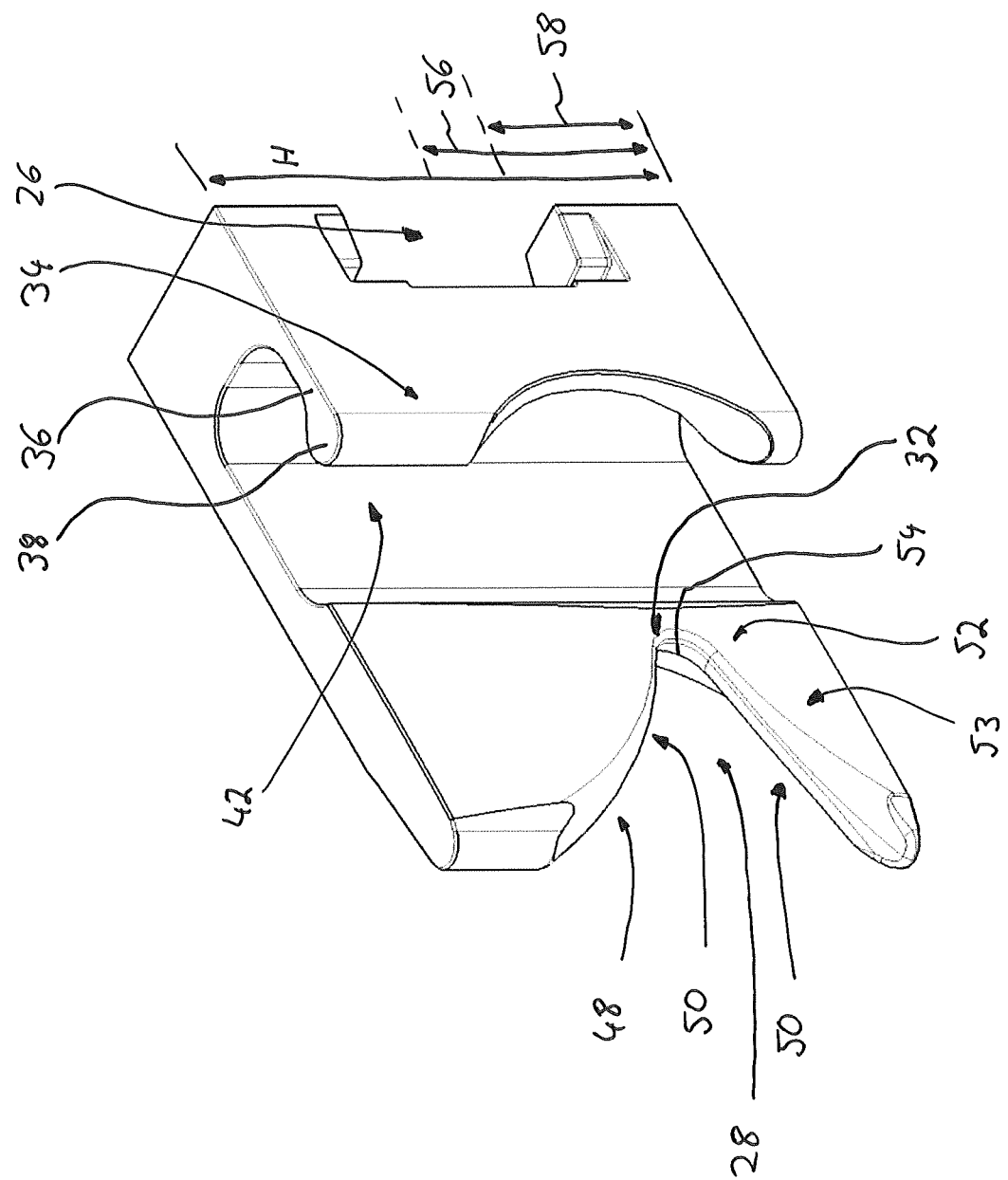
FIG. 7 is a perspective view of another crimping element.

Starting from the states shown in FIGS. 7 and 8, the method for forming the sausage portions 10 can be described as follows: When the crimping elements 24a, 24b are moved towards one another in the manner shown in FIGS. 2 and 3, the casing 12 comes into contact with the arms 30 of the crimping elements 24a, 24b, which are arcuate 48 and have rounded edges 50. In this way, ends of the sausage portions 10 are shaped gently without damaging or even severing the casing 12, in particular alginate casing 12. Only when the alginate casing has been pulled completely or virtually completely around the end of the sausage portion 10 by relative movement of the crimping elements 24a, 24b towards one another does the separation of the sausage portions 10 take place, to a certain extent in a subsequent second step. To this end, the counter holder 34 makes it possible for the crimping elements 24a, 24b to slide into one another.

The contact section 38 of the counter holder 34 corresponds with the slope 40, as a result of which a separating force of the crimping elements 24a, 24b is greater the further the crimping elements 24a, 24b are pressed into one another. In combination with the crowned separating face 52, a defined separating force is generated in the center 54 of the crimping element in order finally to divide the sausage portions 10 without the need for cutting edges formed on the crimping elements 24a, 24b for this purpose. The present invention may manage without such cutting edges on the crimping elements 24a, 24b precisely because it has been found that in the case of alginate casings such cutting edges often separate sausage portions before the alginate casing 12 is pulled completely around the ends of the sausage portions 10.

The embodiments described above are only descriptions of preferred embodiments of the present invention and are not intended to limit the scope of the present invention. Various variations and modifications can be made to the technical solution of the present invention by those of ordinary skills in the art, without departing from the design of the present invention. The variations and modifications should all fall within the claimed scope defined by the claims of the present invention.

What is claimed is:

1. A separating device for separating portions of elongate casings filled with food mixture, comprising:
    two circulating transport elements which are spaced from one another, and can be driven by at least one drive and each having a transport region, which is moved in a transport direction during operation, and a return region,
    wherein a filled casing can be introduced between the transport regions of the two transport elements and can be transported in the transport direction,
    wherein the transport elements are oriented such that a distance between the transport elements is reduced in sections in the transport region in the direction of the transport direction;
    at least one crimping element which is arranged on each transport element and protrudes laterally from the transport element, wherein two crimping elements of the spaced-apart transport elements are moved towards one another when moved in the transport direction, and wherein both crimping elements comprise:
- a fastening section for fastening the crimping element to the transport element,
- a crimping section which extends from the fastening section and has two arms which open from a main section, and
- a counter holder which is designed to press a crimping section of the crimping element arranged on the opposite transport element against the crimping section of the crimping element with a contact force when the crimping elements are moved towards one another, wherein the counter holder is flexible such that the counter holder applies a preloading force to the crimping element arranged on the opposite transport element to improve a separating effect of the crimping elements.

2. The separating device of claim 1, wherein the counter holder has a ridge which extends from the fastening section and a contact section which is arranged adjacently to the ridge, wherein the contact section is designed to come into contact with an opposite crimping element and to apply the contact force to the opposite crimping element.

3. The separating device of claim 2, wherein the ridge has a thickness of 0.5 mm to 5 mm.

4. The separating device of claim 1, wherein the counter holder extends from the fastening section.

5. The separating device of claim 2, wherein the crimping section has, on a side facing away from the counter holder, a slope which is designed to cooperate with the contact section of an opposite crimping element such that opposite crimping elements are pressed against one another when moved towards one another.

6. The separating device of claim 1, wherein the counter holder forms a pocket which is designed to receive a crimping section of an opposite crimping element at least in some sections.

7. The separating device of claim 1, wherein the arms have, on their side facing an adjacently arranged second crimping element during operation, a crowned separating face.

8. The separating device of claim 1, wherein the arms are curved on the side facing away from the counter holder and have rounded edges, so that the filled casing is constricted in a constriction region, displacing the mixture, and the filled casing is pulled around portions before the portions are separated.

9. The separating device of claim 8, wherein the arms extend in an arcuate shape from the main section.

10. The separating device of claim 1, wherein the main section forms a center which is arranged asymmetrically in relation to a total height of the crimping element, and wherein the center is arranged in an operating position in a lower height half in relation to the total height.

11. The separating device of claim 1, wherein the crimping element is formed from one of the following materials: metal
engineering plastic, such as polyoxymethylene.

12. The separating device of claim 1, wherein the transport elements have receiving elements for receiving the fastening sections of the crimping elements.

13. A crimping element for a separating device for separating portions of elongate casings filled with food mixture, wherein the crimping element comprises:
- a fastening section for fastening the crimping element to a transport element,
- a crimping section which extends from the fastening section and has two arms which open from a main section,
- a counter holder which is designed to press a crimping section of the crimping element arranged on an opposite transport element against the crimping section of the crimping element with a contact force when the crimping elements are moved towards one another, wherein the counter holder is flexible such that the counter holder applies a preloading force to the crimping element arranged on the opposite transport element to improve a separating effect of the crimping elements.

14. The crimping element of claim 13, wherein the arms are curved on a side facing away from the counter holder and have rounded edges, so that the filled casing is constricted in a constriction region, displacing the mixture, and the filled casing is pulled around portions before the portions are separated.

15. A method for forming and separating portions of elongate casings filled with food mixture, comprising:
- inserting food mixture into the casing to be filled by a filling machine,
- transporting the filled casing in a transport direction by the separating device of claim 1,
wherein the filled casing is brought between two drivable, circulating transport elements and is constricted in a constriction region and separated by two adjacently arranged crimping elements which are each arranged on a transport element,
wherein the crimping elements have a counter holder which is designed to press a crimping section of the crimping element arranged on an opposite transport element against the crimping section of the crimping element with a contact force when the crimping elements are moved towards one another,
wherein the counter holder is flexible such that the counter holder applies a preloading force to the crimping element arranged on the opposite transport element to improve a separating effect of the crimping elements.

* * * * *